(12) United States Patent
Garrido

(10) Patent No.: US 7,255,395 B2
(45) Date of Patent: Aug. 14, 2007

(54) SEAT ASSEMBLY WITH MOVABLE INNER SEAT BACK

(75) Inventor: Pascal Garrido, Kilworthy (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 11/136,061

(22) Filed: May 24, 2005

(65) Prior Publication Data

US 2005/0258677 A1    Nov. 24, 2005

Related U.S. Application Data

(60) Provisional application No. 60/574,030, filed on May 24, 2004.

(51) Int. Cl.
*B60N 2/64* (2006.01)
(52) U.S. Cl. ............... 297/284.7; 297/343; 297/353
(58) Field of Classification Search ............ 297/284.7, 297/317, 320, 343, 353, 284.1; 244/118.6, 244/122 R
See application file for complete search history.

(56) References Cited

U.S. PATENT DOCUMENTS

| | | | | |
|---|---|---|---|---|
| 4,585,273 A | * | 4/1986 | Higgs et al. | 297/452.18 |
| 4,616,874 A | * | 10/1986 | Pietsch et al. | 297/343 |
| 5,071,190 A | * | 12/1991 | Tame | 297/344.15 |
| 5,219,204 A | * | 6/1993 | Bathrick et al. | 297/321 |
| 5,286,091 A | * | 2/1994 | Busch | 297/487 |
| 5,735,574 A | * | 4/1998 | Serber | 297/343 |
| 5,918,943 A | * | 7/1999 | Mitschelen et al. | 297/452.18 |
| 6,082,823 A | * | 7/2000 | Aumont et al. | 297/483 |
| 6,168,235 B1 | | 1/2001 | Freund | |
| 6,276,635 B1 | * | 8/2001 | Ferry et al. | 244/118.6 |
| 6,309,019 B1 | | 10/2001 | Downey et al. | |
| 6,641,214 B2 | * | 11/2003 | Veneruso | 297/322 |
| 6,669,143 B1 | * | 12/2003 | Johnson | 244/122 R |
| 2005/0151405 A1 | * | 7/2005 | Dowty et al. | 297/353 |

* cited by examiner

*Primary Examiner*—Peter R. Brown
(74) *Attorney, Agent, or Firm*—Kevin S. MacKenzie; Gifford Krass; Dean B. Watson

(57) ABSTRACT

A seat assembly includes a seat cushion, an adjuster mechanism and a seat back. The seat cushion has opposite front and rear ends. The adjuster mechanism is operatively coupled between the floor of the motor vehicle and the seat cushion. The adjuster mechanism allows selective adjustment of the seat cushion relative to the floor among a plurality of vertical positions. The seat back has an outer frame. The outer frame has spaced apart side members. The seat back has an inner frame slidably engaged with the side members for movement along a path defined by the side members. The inner frame of seat back is connected to the rear end of the seat cushion for movement of the inner frame relative to the outer frame along the path in response to corresponding adjustment of the seat cushion among the plurality of vertical positions.

15 Claims, 4 Drawing Sheets

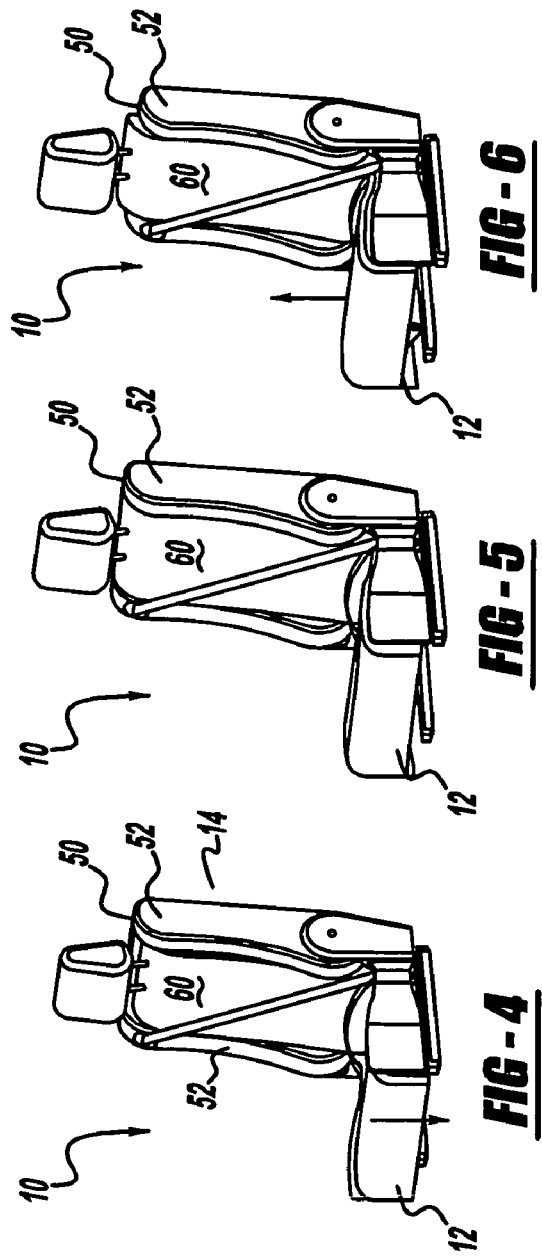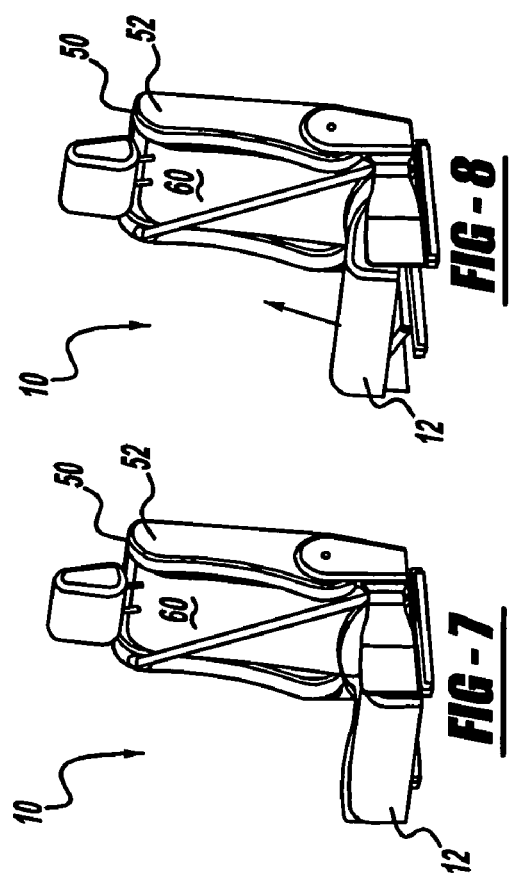

SEAT ASSEMBLY WITH MOVABLE INNER SEAT BACK

CROSS REFERENCE TO RELATED APPLICATIONS

This application claims priority to U.S. Provisional Patent Application Ser. No. 60/574,030 filed May 24, 2004, the entire content of which is incorporated herein by reference.

BACKGROUND OF THE INVENTION

1. Field of the Invention

The invention relates to seat assemblies for motor vehicles. More particularly, the invention relates to a seat back having an inner seat back independently movable with respect to an outer seat back.

2. Description of the Related Art

A motor vehicle includes at least one seat assembly for supporting an occupant within a passenger compartment of the motor vehicle. The seat assembly includes a seat cushion and a seat back for supporting the torso of an occupant seated on the seat cushion. Typically, the seat back is pivotable relative to the seat cushion between a plurality of seating positions. Further, the seat assembly is typically mounted to a floor mounted seat adjuster that allows horizontal and vertical comfort adjustment of the seat cushion and seat back together relative to the floor of the vehicle.

Some seat assembly designs, commonly referred to as "All Belt to Seat" (ABTS) designs, include belt restraint devices incorporated into the seat structure. Vehicle manufacturers desire ABTS designs for a variety of reasons, such as reduced complexity in the assembly of the vehicle, improved comfort due to the more proximal location of the belt exit point relative to the occupant, and packaging concerns related to a particular vehicle design.

The seat back in a conventional ABTS design typically includes at least one reinforced side member that bears the majority of the forces or "belt loads" associated with the restraint device. Due to the potential magnitude of the belt loads, the reinforced side member is coupled directly to the horizontal rails of the seat adjuster. As a result, the seat back in a conventional ABTS design is not vertically adjustable with the seat cushion.

It, therefore, remains desirable to provide an ABTS design having a seat back, or at least a portion thereof, vertically adjustable with the seat cushion especially to provide proper lumbar support in the vertical axis.

SUMMARY OF THE INVENTION

According to one aspect of the invention, a seat assembly is provided for supporting an occupant above a floor of a motor vehicle. The seat assembly includes a seat cushion, an adjuster mechanism and a seat back. The seat cushion has opposite front and rear ends. The adjuster mechanism is operatively coupled between the floor of the motor vehicle and the seat cushion. The adjuster mechanism allows selective adjustment of the seat cushion relative to the floor among a plurality of vertical positions. The seat back has an outer frame. The outer frame has spaced apart side members. The seat back has an inner frame slidably engaged with the side members for movement along a path defined by the side members. The inner frame of seat back is connected to the rear end of the seat cushion for movement of the inner frame relative to the outer frame along the path in response to corresponding adjustment of the seat cushion among the plurality of vertical positions.

According to another aspect of the invention, the seat assembly includes a seat cushion, an adjuster mechanism and a seat back. The seat cushion has opposite front and rear ends. The adjuster mechanism is operatively coupled between the floor of the motor vehicle and the seat cushion. The adjuster mechanism allows selective adjustment of the seat cushion relative to the floor among a plurality of vertical positions. The seat back has an outer frame and an inner frame. The outer frame has spaced apart side members, wherein at least one of the side members comprises a tower defining a belt exit for a seat belt. The tower is adapted to withstand loads associated with the weight of the occupant against the seat belt during a sudden deceleration of the vehicle. The inner frame is slidably engaged with the side members for movement along a path defined by the side members. The inner frame of the seat back is connected to the rear end of the seat cushion for movement of the inner frame relative to the outer frame along the path in response to corresponding adjustment of the seat cushion among the plurality of vertical positions.

According to another aspect of the invention, the seat back has an outboard side proximal to a sidewall of the vehicle. The seat back has an inboard side opposite the outboard side. The inboard side of the seat back being further spaced apart from the sidewall of the vehicle than the outboard side of the seat back. The seat back further has a tower defining a belt exit for a seat belt. The tower is adapted to withstand loads associated with the weight of the occupant against the seat belt during a sudden deceleration of the vehicle. The tower is disposed along the inboard side of the seat back.

BRIEF DESCRIPTION OF THE DRAWINGS

Advantages of the present invention will be readily appreciated as the same becomes better understood by reference to the following detailed description when considered in connection with the accompanying drawings, wherein:

FIGS. 3–7 are perspective views of the seat assembly of FIG. 1 illustrating the various positions of the seat cushion and seat back of the seat assembly; and FIG. 8 is a front perspective view of a front row of seat assemblies according to a second embodiment of the invention.

DETAILED DESCRIPTION OF THE INVENTION

Figure 1:
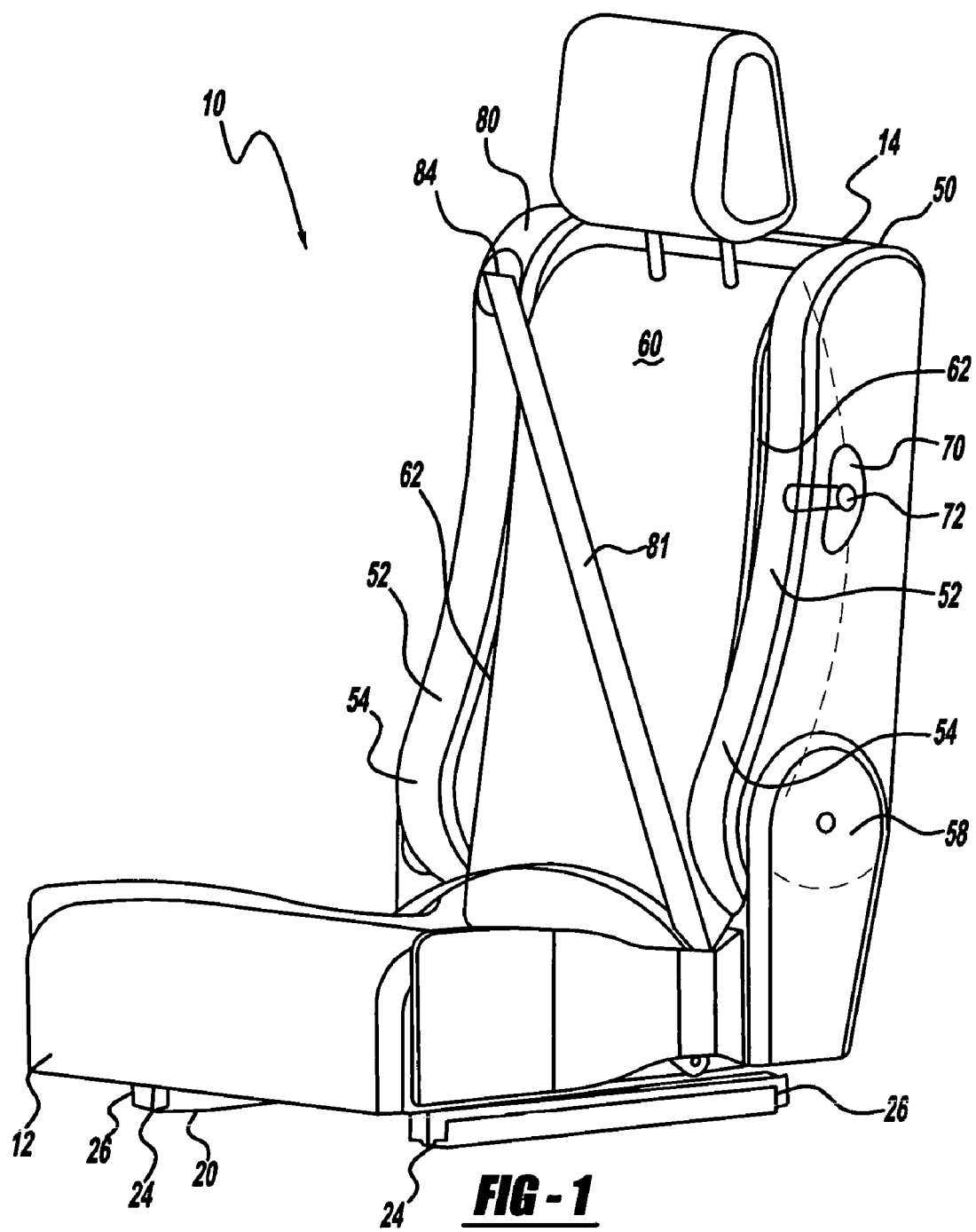
FIG. 1 is a front perspective view of a seat assembly according to an embodiment of the invention.

Referring to FIG. 1, a seat assembly for a motor vehicle is generally indicated at 10. The seat assembly 10 includes a generally horizontal seat cushion 12, a generally upright seat back 14, and a head restraint 16 fixedly secured to a top portion of the seat back 14. The seat assembly 10 also includes an adjuster mechanism 20 coupled between a bottom surface of the seat cushion 12 and the floor of the vehicle.

Figure 2:
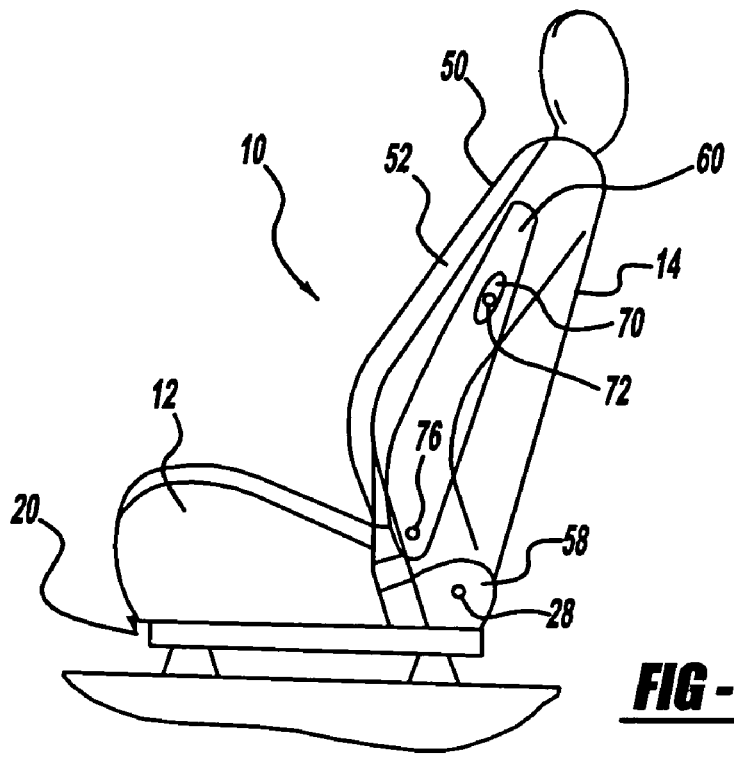
FIG. 2 is a perspective view of an adjuster assembly for the seat assembly.
Figure 3:
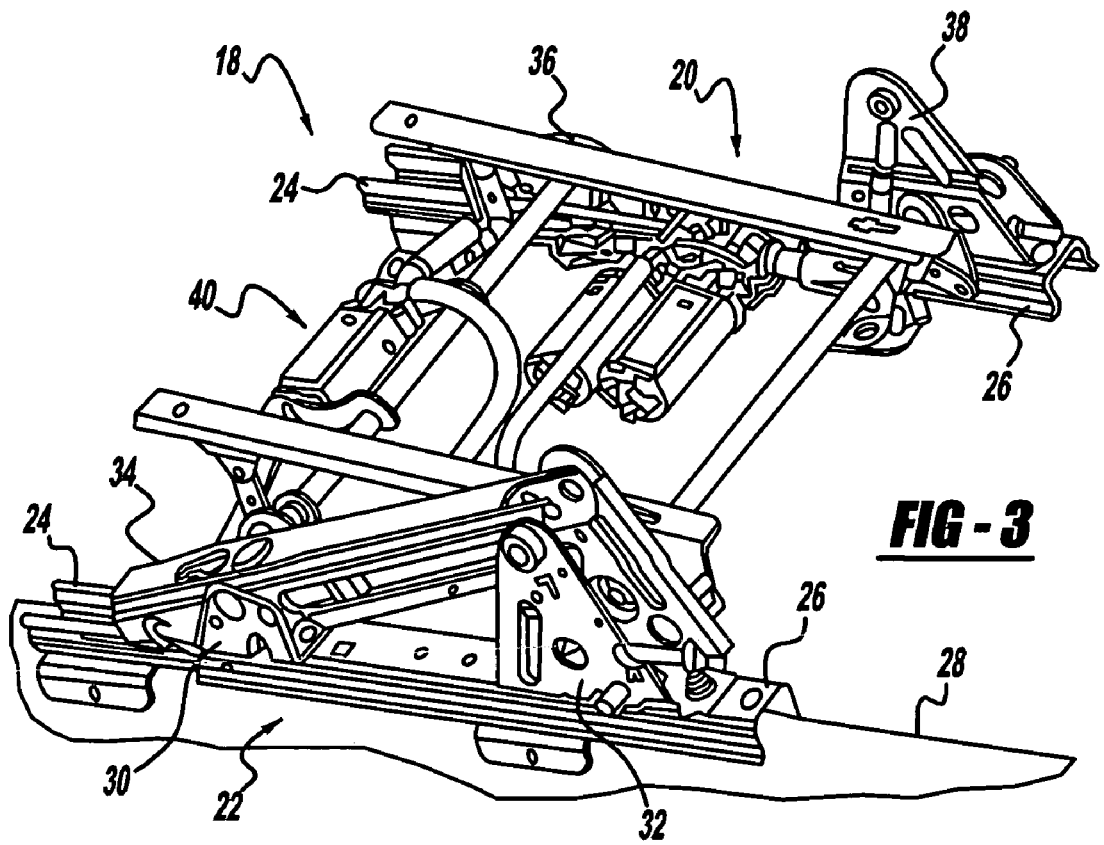
Figure 9:
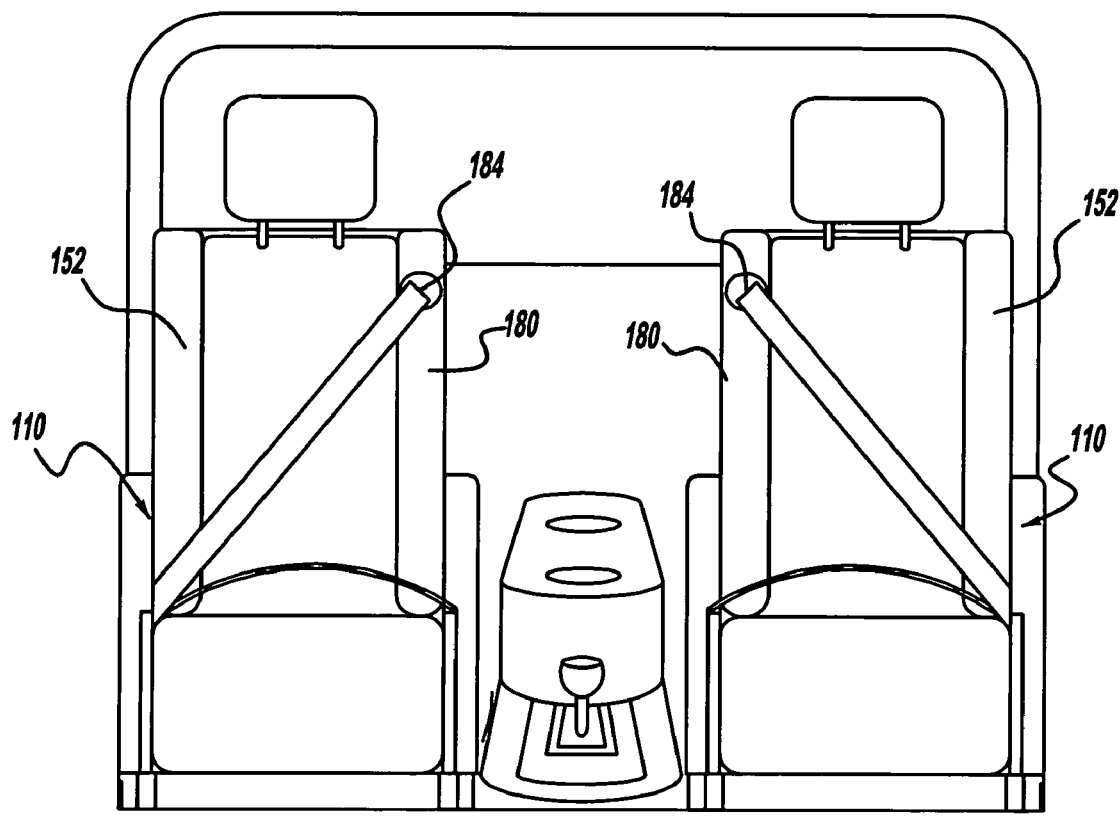

Referring to FIG. 2, the adjuster mechanism 20 includes opposite and spaced apart inboard 21 and outboard 22 sides. Each side of the adjuster mechanism 20 includes a lower track 24 and an upper track 26. The lower track 24 is fixedly secured to the floor of the vehicle. The upper track 26 is slidably coupled to the lower track 24 for generally forward and rearward movement of the upper track 26 relative to the floor of the vehicle. A bottom support frame 36 for supporting the seat cushion 12 is operatively coupled to the upper track 26 for vertical movement of the bottom support frame 36 and seat cushion 12 relative to the upper track 26. A first support member 30 and a second support member 32 are mounted to the upper track 26 on the outboard side 22. A load transfer member or beam 34 is fixedly secured to the first 30 and second 32 support members.

Preferably, the horizontal movement of the upper track 26 relative to the lower track 24 and the vertical movement of the bottom support frame 36 relative to the upper track 26 are driven by electric motors, which are generally indicated at 40. A more detailed description of the adjuster mechanism 20 and its operation are disclosed in U.S. Pat. No. 6,089,665, the content of which is incorporated herein by reference in its entirety.

Referring back to FIG. 1, the seat back 14 includes an outer frame 50 and an inner frame 60. The outer frame 50 has generally parallel and spaced apart side members 52 each extending between opposite upper and lower ends. The outer frame also has a cross member 56 that extends between the upper ends of the side members 52. The lower ends of the side members 52 are fixedly secured to respective upper tracks 26 by recliner mechanisms 58 providing pivotal movement of the seat back 14 relative to the upper track 26 about a recline axis 28. Preferably, the recliner mechanisms 58 are continuously engaged rotary recliners, as known by those of ordinary skill in the art. Most preferably, the recliner mechanisms 58 are driven by electric motors (not shown). The inner frame 60 is adapted to fit in the space defined between the side members 52. The inner frame 60 has sides 62 generally parallel with the side members 52 of the outer frame 50.

Each frame 50, 60 is covered by a foam pad concealed by a cut and sewn trim cover. The foam pads are shaped to substantially follow the shape of the respective underlying frames 50, 60. Generally, the foam pads provide an occupant supporting surface for each frame 50, 60. Preferably, bolsters 54 for supporting the sides of the occupant's torso are defined in the foam pad extending along the side members 52; and a lumbar support 64 is defined in the foam pad covering the inner frame 60.

Slots or grooves 70 are formed in the side members 52. Optionally, tracks having grooves are fixedly secured to the side member 52. The grooves 70 define a path of movement for the inner frame 60. The path can be linear, arcuate, or a combination thereof. Preferably, the path is substantially parallel with the side members 52. The inner frame 60 is slidably coupled to the side members 52 of the outer frame 50 for movement along the path. More specifically, pins 72 extend outwardly from the sides 62 of the inner frame 60, which are slidably engaged with the respective grooves 70 of the side members 52. A bottom edge 74 of the inner frame 60 is pivotally coupled to a rear end of the seat cushion 12 for movement about a pivot axis 76. Vertical adjustment of the seat cushion 12 causes corresponding sliding movement of the inner frame 60 relative to the outer frame 50 along the path defined by the grooves 54. By this arrangement, the lumbar support 64 on the inner frame 60 can remain in close proximity to the lumbar region of the occupant as the seat cushion 12 is vertically adjusted. The pivot axis 76 defined between the inner frame 60 and the seat cushion 12 is generally parallel with and spaced apart from the recline axis 28 of the outer frame 50. The pins 72, therefore, allow the inner frame 60 to slide and pivot relative to the outer frame 50 during pivotal movement of the outer frame 50 about the recline axis 28 to accommodate the spaced relation between the recline axis 28 of the outer frame 50 and the pivot axis 76 between the inner frame 60 and the seat cushion 12.

Optionally, longitudinally extending flanges along the sides 62 of the inner frame 60 are slidably engaged with the grooves 70 instead of the pins 72, so that movement of the inner frame 60 is limited to sliding movement along the path defined by the grooves 70. In this case, the pivotal connection between the bottom edge 74 of the inner frame 60 can include a lost motion arrangement, such as a pin and slot design, to accommodate the spaced relation between the recline axis 28 of the outer frame 50 and the pivot axis 76 between the inner frame 60 and the seat cushion 12 during movement of the outer frame 50 about the recline axis 28. Alternatively, rearward reclining adjustment of the outer frame 50 can be limited by design, thereby obviating the need to address the spaced relation between the recline axis 28 of the outer frame 50 and the pivot axis 76 between the inner frame 60 and the seat cushion 12.

Optionally, the top portion of inner frame 60 can be fixedly secured to the top portion of outer frame 50, while the bottom part of frame 60 is allowed to flex or stretch and remain connected with seat cushion 12 during rotation of the outer frame 50 about the recline axis 28.

Preferably, the head restraint 16 is fixedly secured to the top portion of the inner frame 60 for sliding movement therewith relative to the outer frame 50. Alternatively, the head restraint 16 can be mounted to a top portion of the outer frame 50 and, therefore, not move with the inner frame 60 during vertical adjustment of the seat cushion 12.

In use, the occupant can adjust the seat cushion 12 between a down position, as shown in FIG. 4, an up position, as shown in FIG. 6, and any one of a plurality of vertical positions therebetween, as illustrated by the middle position shown in FIG. 5. The seat back 14 will follow vertically with the rear end of the seat cushion 12 among these aforementioned vertical positions. The seat back 14 also follows the vertical displacement of the rear end of the seat cushion 12 as the seat cushion 12 is tilted between the base position of FIG. 7 and the tilted position of FIG. 8.

In a preferred embodiment of the invention, the seat assembly 10 is an ABTS seat incorporating the aforementioned outer 50 and inner 60 frame construction. At least one of the side members 52 of the outer frame 50, i.e. the side member 52 that is outboard with respect to the vehicle, comprises a tower member 80 adapted to withstand torsional and bending forces or loads associated with the weight of the occupant against a seat belt 81 during a sudden deceleration of the vehicle. The belt retractor 82 is fixedly secured to any suitable location on the seat assembly 10, such as within the tower member 80 or to a bracket depending from the outer frame 50 of the seat back 14. The belt is guided by a spool through an opening or belt exit 84 defined along a front face of the tower 80. The free end of the belt is fixedly secured to the upper track 26, on the same side of the seat assembly as the tower 80. Optionally, the belt exit 84 is defined in a bezel (not shown) that is movably adjustable in a longitudinal sense along the tower 80.

A second embodiment of the invention is shown in Figure LAST, wherein the tower 180 is located along the inboard side of a front seat assembly 110 rather than the outboard side. That is, the tower 180 is now further spaced apart from the vehicle sidewall or closer to the center line of the vehicle than the outboard side member 152. Further, the first and second support members and the beam are mounted to the upper track on the inboard side of the adjuster. Illustratively, an occupant seated on the right side of the vehicle will find the belt exit 184 over his inboard or left shoulder rather than over his outboard or right shoulder in the previous embodiment, and vice versa. The seat assembly 110 of the second embodiment provides several advantages over seats with conventionally located belt exits; one advantage, for example, being unhindered ingress and egress for rear seat passengers in a vehicle having only two side doors.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A seat assembly for supporting an occupant above a floor of a motor vehicle, said seat assembly comprising:
    a seat cushion having opposite front and rear ends;
    an adjuster mechanism operatively coupled between the floor of the motor vehicle and the seat cushion, said adjuster mechanism allowing selective adjustment of said seat cushion relative to the floor among a plurality of vertical positions; and
    a seat back having an outer frame, said outer frame having spaced apart side members, and wherein the spaced apart side members include bolsters formed thereon, said seat back having an inner frame slidably engaged with said side members for movement along a path defined by said side members, said inner frame including a lumbar support formed thereon, said inner frame of seat back being connected to said rear end of said seat cushion for movement of said inner frame relative to said outer frame along said path in response to corresponding adjustment of said seat cushion among said plurality of vertical positions wherein said lumbar support moves vertically relative to said holsters that remain fixed in position.

2. The seat assembly as set forth in claim 1, wherein said side members are pivotally coupled to said adjuster mechanism for selective adjustment of said seat back about a recline axis.

3. The seat assembly as set forth in claim 2, wherein said inner frame is pivotally coupled to said rear end of said seat cushion about a pivot axis that is generally parallel and spaced apart from said recline axis.

4. The seat assembly as set forth in claim 3, wherein said side members include grooves defining said path of movement of said inner frame relative to said outer frame.

5. The seat assembly as set forth in claim 4, wherein said inner frame extends between opposite and spaced apart sides, said inner frame having pins extending outwardly from respective sides of said inner frame, said pins being slidably and pivotally engaged with said grooves of said side members.

6. The seat assembly as set forth in claim 5, wherein said sides of said inner frame are generally parallel with said side members of said outer frame.

7. The seat assembly as set forth in claim 3, wherein said connection of said inner frame and said rear end of said seat cushion includes a lost motion arrangement that accommodates said spaced apart relationship between said recline axis and said pivot axis during movement of said outer frame about said recline axis.

8. The seat assembly as set forth in claim 1, wherein said seat back includes a tower defining a belt exit for a seat belt, said tower being adapted to withstand loads associated with the weight of the occupant against said seat belt during a sudden deceleration of the vehicle.

9. The seat assembly as set forth in claim 1, wherein said seat assembly includes a head restraint for supporting the head of the occupant, said head restraint being fixedly secured to said inner frame for movement therewith relative to said outer frame.

10. The seat assembly as set forth in claim 1, wherein said inner frame has flanges extending outwardly from respective sides of said inner frame, said flanges being slidably engaged with said grooves of said side members.

11. A seat assembly for supporting an occupant above a floor of a motor vehicle, said seat assembly comprising:
    a seat cushion having opposite front and rear ends;
    an adjuster mechanism operatively coupled between the floor of the motor vehicle and the seat cushion, said adjuster mechanism allowing selective adjustment of said seat cushion relative to the floor among a plurality of vertical positions; and
    a seat back having:
    an outer frame, said outer frame having spaced apart side members, and wherein the spaced apart side members include bolsters formed thereon, at least one of said side members comprising a tower defining a belt exit for a seat belt, said tower being adapted to withstand loads associated with the weight of the occupant against said seat belt during a sudden deceleration of the vehicle; and
    an inner frame, said inner frame including a lumbar support formed thereon, said inner frame being slidably engaged with said side members for movement along a path defined by said side members, said inner frame of seat back being connected to said rear end of said seat cushion for movement of said inner frame relative to said outer frame along said path in response to corresponding adjustment of said seat cushion among said plurality of vertical positions wherein said lumbar support moves vertically relative to said bolsters that remain fixed in position.

12. The seat assembly as set forth in claim 11, wherein said side members are pivotally coupled to said adjuster mechanism for selective adjustment of said seat back about a recline axis.

13. The seat assembly as set forth in claim 12, wherein said inner frame is pivotally coupled to said rear end of said seat cushion about a pivot axis that is generally parallel and spaced apart from said recline axis.

14. The seat assembly as set forth in claim 13, wherein said side members include grooves defining said path of movement of said inner frame relative to said outer frame.

15. The seat assembly as set forth in claim 11, wherein said tower is disposed along an inboard side of said seat assembly.

* * * * *